United States Patent
Laradji et al.

(10) Patent No.: US 11,151,417 B2
(45) Date of Patent: Oct. 19, 2021

(54) METHOD OF AND SYSTEM FOR GENERATING TRAINING IMAGES FOR INSTANCE SEGMENTATION MACHINE LEARNING ALGORITHM

(71) Applicant: Element AI Inc., Montreal (CA)

(72) Inventors: Issam Hadj Laradji, Montreal (CA); David Vazquez Bermudez, Montreal (CA)

(73) Assignee: Element AI Inc., Montreal (CA)

( * ) Notice: Subject to any disclaimer, the term of this patent is extended or adjusted under 35 U.S.C. 154(b) by 0 days.

(21) Appl. No.: 16/778,597

(22) Filed: Jan. 31, 2020

(65) Prior Publication Data

US 2021/0241034 A1   Aug. 5, 2021

(51) Int. Cl.
| | |
|---|---|
| *G06K 9/00* | (2006.01) |
| *G06K 9/62* | (2006.01) |
| *G06T 7/11* | (2017.01) |
| *G06N 3/04* | (2006.01) |
| *G06N 3/08* | (2006.01) |

(52) U.S. Cl.
CPC ......... *G06K 9/6257* (2013.01); *G06K 9/6267* (2013.01); *G06N 3/04* (2013.01); *G06N 3/08* (2013.01); *G06T 7/11* (2017.01); *G06T 2207/20076* (2013.01); *G06T 2207/20081* (2013.01); *G06T 2207/20084* (2013.01)

(58) Field of Classification Search
CPC ...... G06K 9/6257; G06K 9/6267; G06T 7/11; G06T 2207/20081; G06T 2207/20084; G06T 2207/20076; G06N 3/04; G06N 3/08

See application file for complete search history.

(56) References Cited

U.S. PATENT DOCUMENTS

2021/0027098 A1\*   1/2021   Ge ..................... G06T 11/20
2021/0042532 A1\*   2/2021   Latapie ............. G06K 9/00771

OTHER PUBLICATIONS

Angela et al. "CLoDSA: a tool for augmentation in classification, localization, detection, semantic segmentation and instance segmentation tasks", Jun. 13, 2019, BMC Bioinformatics (2019) 20:323, pp. 1-14 (Year: 2019).\*

\* cited by examiner

*Primary Examiner* — Ping Y Hsieh
(74) *Attorney, Agent, or Firm* — Fasken Martineau DuMoulin S.E.

(57) ABSTRACT

A method and a system for generating training images for training an instance segmentation machine learning algorithm (MLA). A set of image-level labelled images are received, where a given image is labelled with a label indicative of a presence of an object having an object class in the image. A classification MLA detects the object having the object class in each image. A class activation map (CAM) indicative of discriminative regions used by the classification MLA for detecting the object in each image is generated. A region proposal MLA is used to generate region proposals for each image. A pseudo mask of the respective object is generated based on the region proposals and the CAM, where a pseudo mask is indicative of pixels corresponding to the respective object class. The pseudo masks are used as a label with the image-level labelled images for training the instance segmentation MLA.

20 Claims, 10 Drawing Sheets

METHOD OF AND SYSTEM FOR GENERATING TRAINING IMAGES FOR INSTANCE SEGMENTATION MACHINE LEARNING ALGORITHM

CROSS-REFERENCE TO RELATED APPLICATIONS

None.

FIELD

The present technology relates to machine learning algorithms (MLAs) and computer vision in general and more specifically to a method of and a system for generating training images and for training an instance segmentation machine learning model based on image-level labelled images.

BACKGROUND

Improvements in computer hardware and technology coupled with the multiplication of connected mobile electronic devices have spiked interest in developing solutions for task automatization, outcome prediction, information classification and learning from experience, resulting in the field of machine learning. Machine learning, closely related to data mining, computational statistics and optimization, explores the study and construction of algorithms that can learn from and make predictions on data.

The field of machine learning has evolved extensively in the last decade, giving rise to self-driving cars, speech recognition, image recognition, personalization, and understanding of the human genome. In addition, machine learning enhances different information retrieval activities, such as document searching, collaborative filtering, sentiment analysis, and so forth.

Machine learning algorithms (MLAs) may generally be divided into broad categories such as supervised learning, unsupervised learning and reinforcement learning. Supervised learning consists of presenting a machine learning algorithm with training data consisting of inputs and outputs labelled by assessors, where the goal is to train the machine learning algorithm such that it learns a general rule for mapping inputs to outputs. Unsupervised learning consists of presenting the machine learning algorithm with unlabeled data, where the goal is for the machine learning algorithm to find a structure or hidden patterns in the data. Reinforcement learning consists of having an algorithm evolving in a dynamic environment without providing the algorithm with labeled data or corrections.

Instance segmentation is the task of classifying every object pixel into a category and discriminating between individual object instances in an image. Instance segmentation has a wide variety of applications such as autonomous driving, scene understanding, and medical imaging, among others.

Recent progress in Deep Neural Networks (DNNs) and segmentation frameworks has given us improvements in the task of instance segmentation. Nonetheless, these techniques require a large number of training data with per-pixel labels, or labels which distinguish between object categories and instances in the image. As acquiring such training data is often prohibitively expensive, the effectiveness of these methods is limited to a small range of datasets and object categories.

Weakly supervised methods have emerged to overcome the need for per-pixel labels, where only "weaker" labels are required such as bounding boxes, scribbles and image-level annotations, which makes the acquisition of training datasets a more scalable endeavour.

SUMMARY

It is an object of one or more embodiments of the present technology to improve at least one of the limitations present in the prior art. One or more embodiments of the present technology may provide and/or broaden the scope of approaches to and/or methods of achieving the aims and objects of the present technology.

One or more embodiments of the present technology have been developed based on developers' appreciation that acquiring training data for instance segmentation models is challenging, and having more training data would not only enable to increase performance of models performing instance segmentation, but would also enable to broaden the types of applications of such models.

Developers have appreciated that the acquisition cost for images having image-level labels is lower than for other types of image labels, as an assessor only needs to indicate whether a given class of object is present in an image or not. Such image-level labels may be acquired in a more time efficient manner, which may result in a larger number of training images that could be provided to a machine learning model. Further, due to the acquisition method for such images being simpler, acquisition of image-level labels could be performed by collecting image search results provided by a search engine for a given object class, e.g. image search results for "cat", or could be easily integrated into existing services which could require a human to confirm presence of an object in an image, such as login verification services and the like.

Developers have appreciated that image-level labels could be used to generate pseudo masks by combining the output of different machine learning models and then used for training instance-level machine learning models. Such pseudo masks, while being rough masks of detected objects, would enable training the instance segmentation MLA to provide accurate results.

The present technology aims to provide a framework for training a fully supervised instance segmentation model on pseudo masks labels obtained from image-level class labels and can combine different localization and segmentation methods. The present technology uses a classification network to obtain pseudo masks by training a peak response map (PRM) model on the image-level labels and leveraging object proposal techniques.

In accordance with a broad aspect of the present technology, there is provided a method for generating a set of training images for an instance segmentation machine learning algorithm (MLA), the method is executed by a processor, the processor has access to: a classification MLA having been trained to detect objects in an image and generate a class activation map (CAM) indicative of discriminative regions used for detecting the objects, and a region proposal MLA having been trained to generate region proposals from an image. The method comprises: receiving a set of image-level labelled images, each image-level labelled image comprising an object class label indicative of a presence of a respective object having a respective object class in the image, detecting, using the classification MLA, in each image-level labelled image, the respective object having the respective object class. The method comprises determining, using the classification MLA, for each image-level labelled image of the set of image-level labelled images, a respective CAM indicative of discriminative regions used by the classification MLA to detect the respective object class. The method comprises generating, using the region proposal MLA, for each image-level labelled image of the set of image-level labelled images, a respective set of region proposals, each region proposal comprising a respective potential object. The method comprises generating, for each image-level labelled image of the set of image-level labelled images, based on the respective CAM and the respective set of region proposals, a respective pseudo mask of the respective object indicative of pixels in the image-level labelled image corresponding to the respective object class, and generating the set of training images to be provided for training the instance segmentation MLA, each training image comprising: a respective object class of the respective object, and the respective pseudo mask of the respective object having the respective object class.

In some embodiments of the method, the method further comprises: training the instance segmentation MLA on the set of training images by using the respective pseudo mask as a target for generating a predicted mask for an object class of an object in a new image.

In some embodiments of the method, the method further comprises, prior to the generating the pseudo mask for each image-level labelled image: generating, by the classification MLA, a respective peak response map (PRM) for each respective CAM by determining a respective set of peaks indicative of local maximas in the respective CAM, and the generating the pseudo mask is further based on the respective PRM.

In some embodiments of the method, the respective set of peaks are indicative of approximate locations of objects having the respective object class.

In some embodiments of the method, the generating the respective pseudo mask for the respective object class comprises: selecting at least one region proposal of the set of region proposals intersecting with a peak of the respective set of peaks in the PRM to obtain the respective pseudo mask.

In some embodiments of the method, each region proposal of the respective set of region proposals is associated with a respective objectness score indicative of a probability of the region proposal comprising a respective object, and the selecting the at least one region proposal is based on the respective objectness score.

In some embodiments of the method, the classification MLA comprises a convolutional neural network, a fully connected layer (FCL), and a peak stimulation layer.

In some embodiments of the method, the instance segmentation MLA comprises a convolutional neural network.

In accordance with a broad aspect of the present technology, there is provided a method for training an instance segmentation machine learning algorithm (MLA), the method is executed by a processor, the processor has access to: a classification MLA having been trained to detect objects in an image and generate a class activation map (CAM) indicative of discriminative regions used for detecting the objects, a region proposal MLA having been trained to generate region proposals from an image, and the instance segmentation MLA. The method comprises: receiving a set of image-level labelled images, each image-level labelled image comprising a respective object class label indicative of a presence of a respective object having a respective object class in the image. The method comprises detecting, using the classification MLA, in each image-level labelled image, the respective object having the respective object class, the detecting comprising generating a respective CAM indicative of discriminative regions used by the classification MLA to detect the respective object class. The method comprises generating, using the region proposal MLA, for each image-level labelled image of the set of image-level labelled images, a respective set of region proposals, each region proposal comprising a respective potential object. The method comprises generating, for each image-level labelled image of the set of image-level labelled images, based on the respective CAM and the respective set of region proposals, a respective pseudo mask of the respective object indicative of pixels in the image-level labelled image corresponding to the respective object class. The method comprises training the instance segmentation MLA on the set of image-level labelled images and the respective pseudo masks by using the respective pseudo mask having the respective object class label as a target.

In some embodiments of the method, the detecting further comprises: generating, by the classification MLA, a respective peak response map (PRM) for each respective CAM by determining a respective set of peaks indicative of local maximas in the respective CAM, and the generating the pseudo mask is further based on the respective PRM.

In some embodiments of the method, the method further comprises: receiving a new image, the new image not being included in the set of image-level labelled images, generating, by the instance segmentation MLA, a set of image features, and detecting, by the instance segmentation MLA, based on the set of image features, an object, the object having an object class, the detecting comprising classifying a set of pixels in the image as belonging to the object class of the object to obtain a predicted mask of the object.

In some embodiments of the method, the method further comprises: generating, using the region proposal MLA, a set of region proposals for the new image, and generating, based on the set of region proposals and the predicted mask of the object, a refined predicted mask.

In accordance with a broad aspect of the present technology, there is provided a system for generating a set of training images for training an instance segmentation machine learning algorithm (MLA). The system comprises a processor, the processor has access to: a classification MLA having been trained to detect objects in an image and generate a class activation map (CAM) indicative of discriminative regions used for detecting the objects, a region proposal MLA having been trained to generate region proposals from an image. The processor is operatively connected to a non-transitory storage medium comprising instructions, the processor, upon executing the instructions, is configured for: receiving a set of image-level labelled images, each image-level labelled image comprising an object class label indicative of a presence of a respective object having a respective object class in the image, detecting, using the classification MLA, in each image-level labelled image, the respective object having the respective object class. The processor is configured for determining, using the classification MLA, for each image-level labelled image of the set of image-level labelled images, a respective CAM indicative of discriminative regions used by the classification MLA to detect the respective object class. The processor is configured for generating, using the region proposal MLA, for each image-level labelled image of the set of image-level labelled images, a respective set of region proposals, each region proposal comprising a respective potential object. The processor is configured for generating, for each image-level labelled image of the set of image-level labelled images, based on the respective CAM and the respective set of region proposals, a respective pseudo mask of the respective object indicative of pixels in the image-level labelled image corresponding to the respective object class. The processor is configured for generating the set of training images to be provided for training the instance segmentation MLA, each training image comprising: a respective object class of the respective object, and the respective pseudo mask of the respective object having the respective object class.

In some embodiments of the system, the processor is further configured for: training the instance segmentation MLA on the set of training images by using the respective pseudo mask as a target for generating a predicted mask for an object class of an object in a new image.

In some embodiments of the system, the processor is further configured for, prior to the generating the pseudo mask for each image-level labelled image: generating, by the classification MLA, a respective peak response map (PRM) for each respective CAM by determining a respective set of peaks indicative of local maximas in the respective CAM, and the generating the pseudo mask is further based on the respective PRM.

In some embodiments of the system, the respective set of peaks are indicative of approximate locations of objects having the respective object class.

In some embodiments of the system, the generating the respective pseudo mask for the respective object class comprises: selecting at least one region proposal of the set of region proposals intersecting with a peak of the respective set of peaks in the PRM to obtain the respective pseudo mask.

In some embodiments of the system, each region proposal of the respective set of region proposals is associated with a respective objectness score indicative of a probability of the region proposal comprising a respective object, and the selecting the at least one region proposal is based on the respective objectness score.

In some embodiments of the system, the classification MLA comprises a convolutional neural network, a fully connected layer (FCL), and a peak stimulation layer.

In some embodiments of the system, the instance segmentation MLA comprises a convolutional neural network.

In accordance with a broad aspect of the present technology, there is provided a system for training an instance segmentation machine learning algorithm (MLA), the system comprises a processor, the processor has access to: a classification MLA having been trained to detect objects in an image and generate a class activation map (CAM) indicative of discriminative regions used for detecting the objects, a region proposal MLA having been trained to generate region proposals from an image, and the instance segmentation MLA. The processor is operatively connected to a non-transitory storage medium comprising instructions, the processor, upon executing the instructions, is configured for: receiving a set of image-level labelled images, each image-level labelled image comprising a respective object class label indicative of a presence of a respective object having a respective object class in the image. The processor is configured for detecting, using the classification MLA, in each image-level labelled image, the respective object having the respective object class, the detecting comprising generating a respective CAM indicative of discriminative regions used by the classification MLA to detect the respective object class. The processor is configured for generating, using the region proposal MLA, for each image-level labelled image of the set of image-level labelled images, a respective set of region proposals, each region proposal comprising a respective potential object The processor is configured for generating, for each image-level labelled image of the set of image-level labelled images, based on the respective CAM and the respective set of region proposals, a respective pseudo mask of the respective object indicative of pixels in the image-level labelled image corresponding to the respective object class. The processor is configured for training the instance segmentation MLA on the set of image-level labelled images and the respective pseudo masks by using the respective pseudo mask having the respective object class label as a target.

In some embodiments of the system, the detecting further comprises: generating, by the classification MLA, a respective peak response map (PRM) for each respective CAM by determining a respective set of peaks indicative of local maximas in the respective CAM, and the generating the pseudo mask is further based on the respective PRM.

In some embodiments of the system, the system is further configured for: receiving a new image, the new image not being included in the set of image-level labelled images, generating, by the instance segmentation MLA, a set of image features, and detecting, by the instance segmentation MLA, based on the set of image features, an object, the object having an object class, the detecting comprising classifying a set of pixels in the image as belonging to the object class of the object to obtain a predicted mask of the object.

In some embodiments of the system, the system is further configured for: generating, using the region proposal MLA, a set of region proposals for the new image, and generating, based on the set of region proposals and the predicted mask of the object, a refined predicted mask.

Definitions

Machine Learning Algorithms (MLA)

A machine learning algorithm (MLA) is a process or sets of procedures that helps a mathematical model adapt to data given an objective. A MLA normally specifies the way the feedback is used to enable the model to learn the appropriate mapping from input to output. The model specifies the mapping function and holds the parameters while the learning algorithm updates the parameters to help the model satisfy the objective.

MLAs may generally be divided into broad categories such as supervised learning, unsupervised learning and reinforcement learning. Supervised learning involves presenting a machine learning algorithm with training data consisting of inputs and outputs labelled by assessors, where the objective is to train the machine learning algorithm such that it learns a general rule for mapping inputs to outputs. Unsupervised learning involves presenting the machine learning algorithm with unlabeled data, where the objective for the machine learning algorithm is to find a structure or hidden patterns in the data. Reinforcement learning involves having an algorithm evolving in a dynamic environment guided only by positive or negative reinforcement.

Non-limiting examples of models used by the MLAs include neural networks (including deep learning (DL) neural network), decision trees, support vector machines (SVMs), Bayesian networks, and genetic algorithms.

Neural Networks (NNs)

Neural networks (NNs), also known as artificial neural networks (ANNs) are a class of non-linear models mapping from inputs to outputs and comprised of layers that can potentially learn useful representations for predicting the outputs. Neural networks are typically organized in layers, which are made of a number of interconnected nodes that contain activation functions. Patterns may be presented to the network via an input layer connected to hidden layers, and processing may be done via the weighted connections of nodes. The answer is then output by an output layer connected to the hidden layers. Non-limiting examples of neural networks includes: perceptrons, back-propagation, Hopfield networks.

Multilayer Perceptron (MLP)

A multilayer perceptron (MLP) is a class of feedforward artificial neural networks. A MLP consists of at least three layers of nodes: an input layer, a hidden layer and an output layer. Except for the input nodes, each node is a neuron that uses a nonlinear activation function. A MLP uses a supervised learning technique called backpropagation for training. A MLP can distinguish data that is not linearly separable.

Convolutional Neural Network (CNN)

A convolutional neural network (CNN or ConvNet) is a NN which is a regularized version of a MLP. A CNN uses convolution in place of general matrix multiplication in at least one layer.

Recurrent Neural Network (RNN)

A recurrent neural network (RNN) is a NN where connection between nodes form a directed graph along a temporal sequence. This allows it to exhibit temporal dynamic behavior. Each node in a given layer is connected with a directed (one-way) connection to every other node in the next successive layer. Each node (neuron) has a time-varying real-valued activation. Each connection (synapse) has a modifiable real-valued weight. Nodes are either input nodes (receiving data from outside the network), output nodes (yielding results), or hidden nodes (that modify the data en route from input to output).

Gradient Boosting

Gradient boosting is one approach to building an MLA based on decision trees, whereby a prediction model in the form of an ensemble of trees is generated. The ensemble of trees is built in a stage-wise manner. Each subsequent decision tree in the ensemble of decision trees focuses training on those previous decision tree iterations that were "weak learners" in the previous iteration(s) of the decision trees ensemble (i.e. those that are associated with poor prediction/high error).

Generally speaking, boosting is a method aimed at enhancing prediction quality of the MLA. In this scenario, rather than relying on a prediction of a single trained algorithm (i.e. a single decision tree) the system uses many trained algorithms (i.e. an ensemble of decision trees), and makes a final decision based on multiple prediction outcomes of those algorithms.

In boosting of decision trees, the MLA first builds a first tree, then a second tree, which enhances the prediction outcome of the first tree, then a third tree, which enhances the prediction outcome of the first two trees and so on. Thus, the MLA in a sense is creating an ensemble of decision trees, where each subsequent tree is better than the previous, specifically focusing on the weak learners of the previous iterations of the decision trees. Put another way, each tree is built on the same training set of training objects, however training objects, in which the first tree made "mistakes" in predicting are prioritized when building the second tree, etc. These "tough" training objects (the ones that previous iterations of the decision trees predict less accurately) are weighted with higher weights than those where a previous tree made satisfactory prediction.

Examples of deep learning MLAs include: Deep Boltzmann Machine (DBM), Deep Belief Networks (DBN), Convolutional Neural Network (CNN), and Stacked Auto-Encoders.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document may include the document itself (i.e. its contents), or it may be a unique document descriptor identifying a file with respect to a particular file system, or some other means of directing the recipient of the indication to a network location, memory address, database table, or other location where the file may be accessed. As one skilled in the art will appreciate, the degree of precision required in such an indication depends on the extent of any prior understanding about the interpretation to be given to information being exchanged as between the sender and the recipient of the indication. For example, if it will be appreciated that prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it will be appreciated that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It will be appreciated that some aspects of the present technology that have resulted from attempting to attain the above-mentioned object may not satisfy this object and/or may satisfy other objects not specifically recited herein.

Additional and/or alternative features, aspects and advantages of implementations of one or more embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
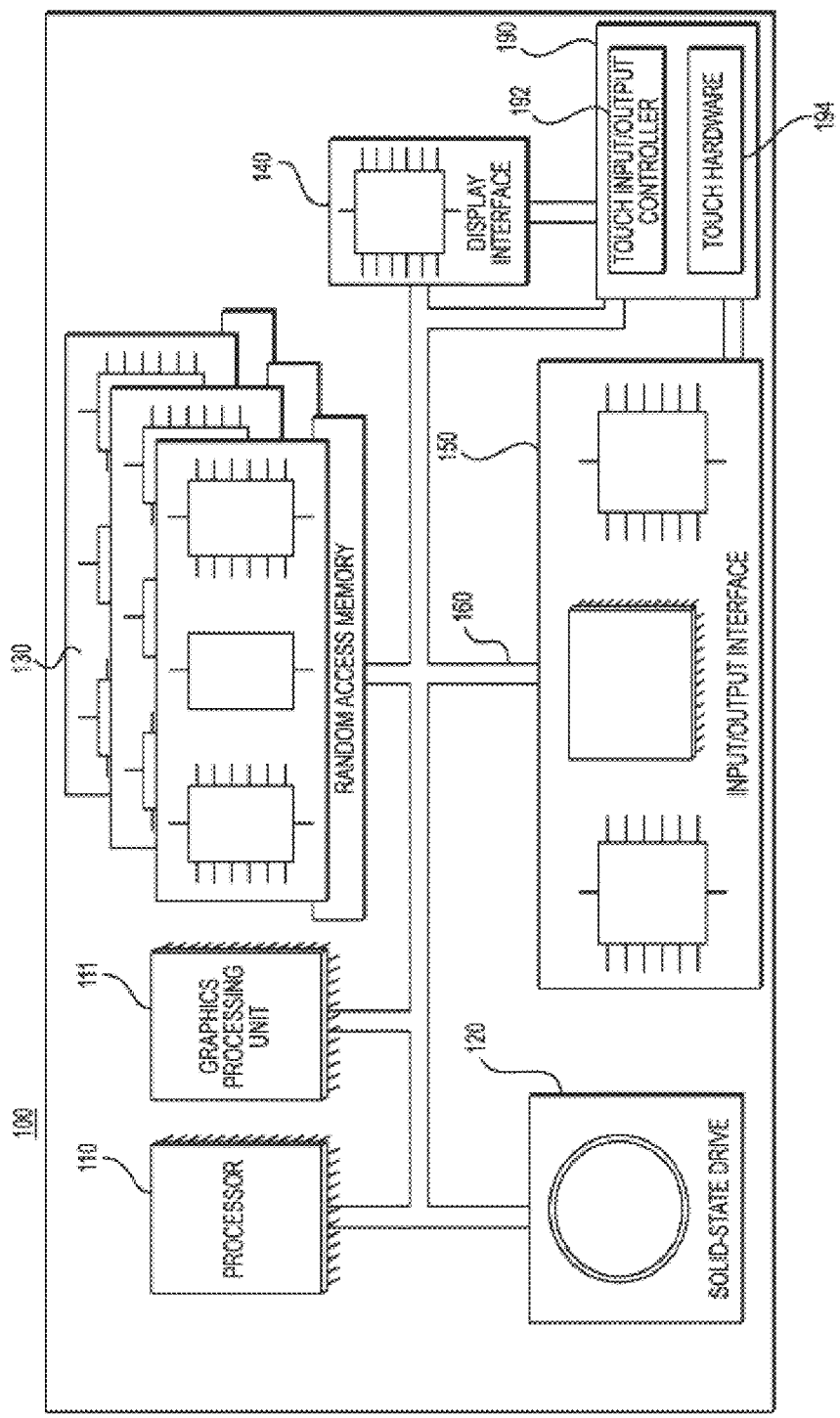
FIG. 1 depicts a schematic diagram of an electronic device in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology.

Furthermore, as an aid to understanding, the following description may describe relatively simplified implementations of the present technology. As a person skilled in the art will appreciate, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by the skilled addressee that any block diagram herein represents conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Now referring to FIG. 1, there is shown an electronic device 100 suitable for use with one or more implementations of the present technology, the electronic device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiment illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) enabling the user to interact with the electronic device 100 in addition or in replacement of the touchscreen 190.

According to one or more implementations of the present technology, the solid-state drive 120 stores program instructions suitable for being loaded into the random-access memory 130 and executed by the processor 110 and/or the GPU 111 for training an instance segmentation machine learning algorithm using pseudo masks generated based on class activation maps and region proposals. For example, the program instructions may be part of a library or an application.

It will be appreciated that the electronic device 100 may be implemented as a server, a desktop computer, a laptop computer, a tablet, a smartphone, a personal digital assistant or any device that may be configured to implement the present technology, as it may be appreciated by a person skilled in the art.

System

Figure 2:
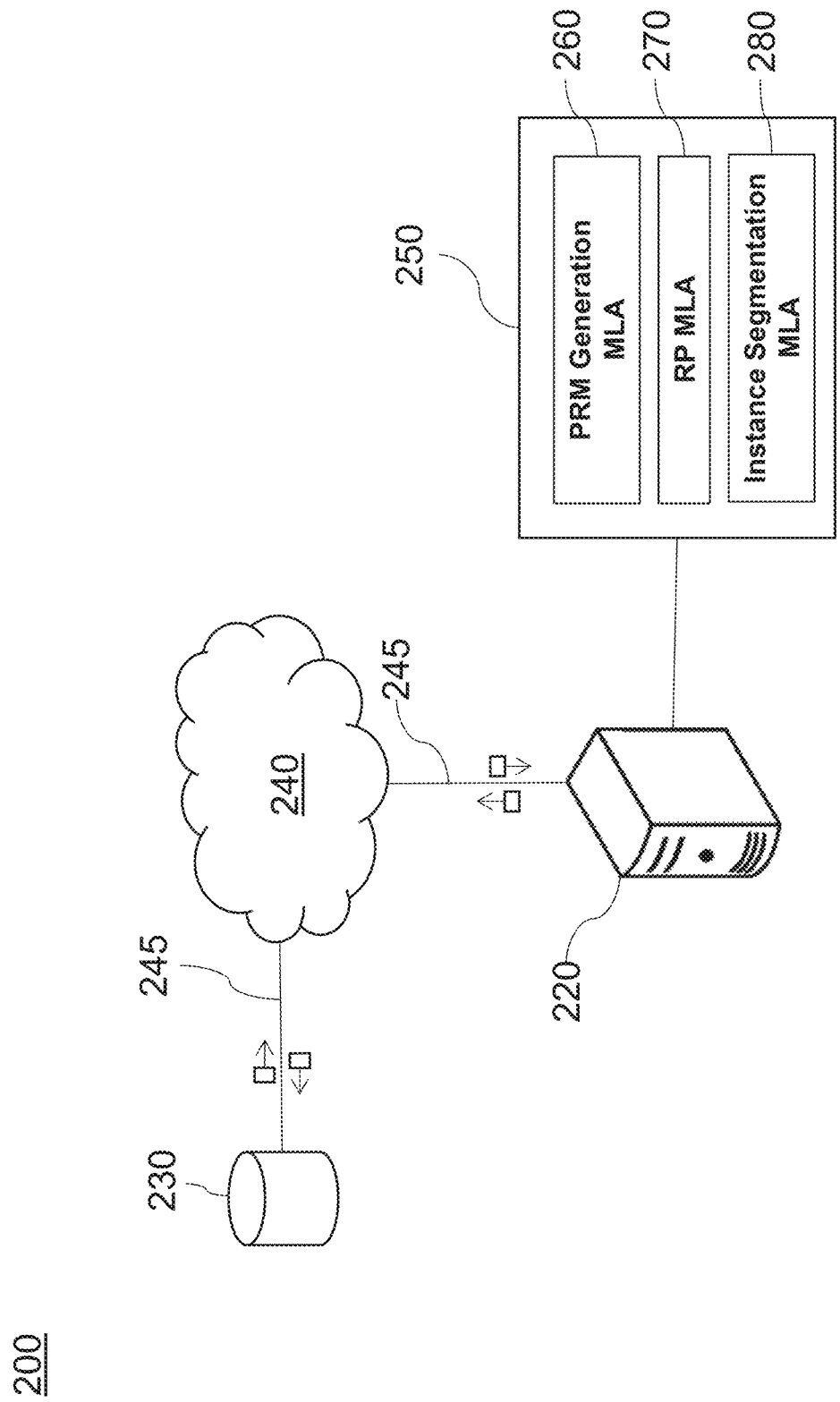
FIG. 2 depicts a schematic diagram of a system in accordance with one or more non-limiting embodiments of the present technology.

Now referring to FIG. 2, there is shown a schematic diagram of a system 200, the system 200 being suitable for implementing one or more non-limiting embodiments of the present technology. It will be appreciated that the system 200 as shown is merely an illustrative implementation of the present technology. Thus, the description thereof that follows is intended to be only a description of illustrative examples of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art will understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art will appreciate, this is likely not the case. In addition, it will be appreciated that the system 200 may provide in certain instances simple implementations of one or more embodiments of the present technology, and that where such is the case they have been presented in this manner as an aid to understanding.

The system 200 comprises inter alia a training server 220, and a database 230, communicatively coupled over a communications network 240 via respective communication links 245.

Training Server

The training server 220 is configured to: (i) receive a set of image-level labelled images; (ii) access the set of MLA 250; (iii) generate class activation maps (CAMs) of the image-level labelled images; (iv) generate region proposals for the image-level labelled images; (v) generate pseudo masks for the set of image-level labelled images based on the CAMs and the region proposals to obtain a set of pseudo mask labelled images; and (vi) train an instance segmentation MLA to perform instance segmentation using the set of the pseudo masks labelled images.

How the training server 220 is configured to do so will be explained in more detail herein below.

It will be appreciated that the training server 220 can be implemented as a conventional computer server and may comprise at least some of the features of the electronic device 100 shown in FIG. 1. In a non-limiting example of one or more embodiments of the present technology, the training server 220 is implemented as a server running an operating system (OS). Needless to say that the training server 220 may be implemented in any suitable hardware and/or software and/or firmware or a combination thereof. In the disclosed non-limiting embodiment of present technology, the training server 220 is a single server. In one or more alternative non-limiting embodiments of the present technology, the functionality of the training server 220 may be distributed and may be implemented via multiple servers (not shown).

It will be appreciated that the implementation of the training server 220 is well known to the person skilled in the art. However, the training server 220 comprises a communication interface (not shown) configured to communicate with various entities (such as the database 230, for example and other devices potentially coupled to the communication network 240) via the network. The training server 220 further comprises at least one computer processor (e.g., the processor 110 of the electronic device 100) operationally connected with the communication interface and structured and configured to execute various processes to be described herein.

Machine Learning Algorithms (MLAs)

The training server 220 has access to the set of MLAs 250.

The set of MLAs 250 include inter alia a PRM generation MLA 260, a region proposal (RP) MLA 270, and an instance segmentation MLA 280.

The PRM generation MLA 260 is configured to: (i) obtain an image; (ii) extract a set of image features; (iii) detect, based on the set of image features, a set of objects, each object having a respective object class; (iv) generate a class activation map (CAM) for each given detected object class in the image; and (v) generate a PRM based on the CAM.

To achieve that purpose, the PRM generation MLA 260 undergoes a training procedure which will be explained in more detail herein below.

It will be appreciated that the set of objects detected by the PRM generation MLA 260 may include one or more objects having a respective object class or category. The class activation map (CAM) for a particular object class indicates the discriminative image regions used by the PRM generation MLA 260 to identify that object class. The peak response map (PRM) comprises local maximas of the CAM which are indicative of approximate location(s) of the detected object in the image.

In one or more embodiments, the PRM generation MLA 260 has a CNN architecture in the form of a CNN classifier network.

Figure 3:
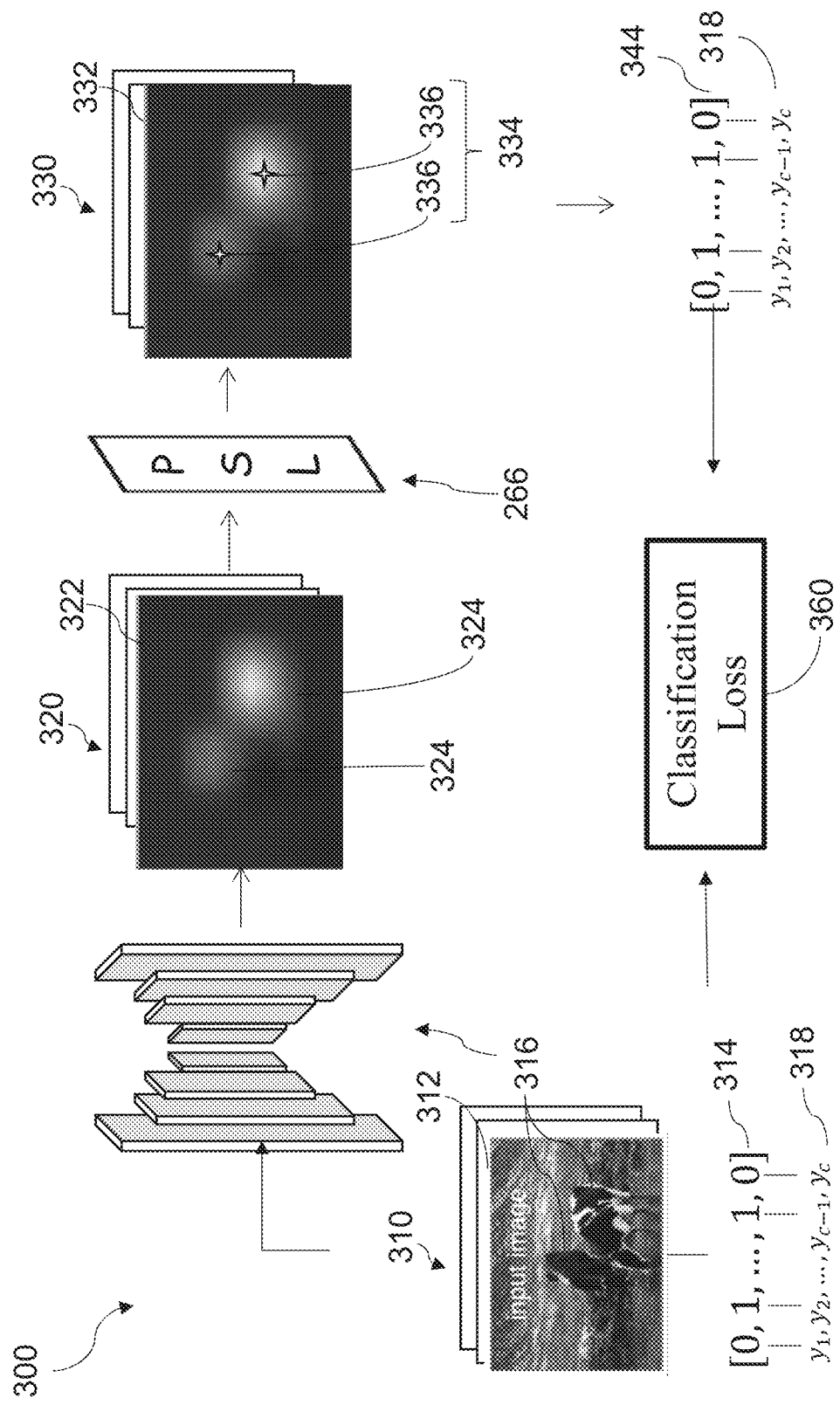
FIG. 3 depicts a schematic diagram of peak response map (PRM) generation training procedure in accordance with one or more non-limiting embodiments of the present technology.

In one or more embodiments, the PRM generation MLA 260 has a CNN architecture that is converted to a fully convolutional network (FCN) by removing global pooling layers and adapting fully connected layers to 1×1 convolution layers (depicted as a standard classification network in FIG. 3). The PRM generation MLA 260 includes a peak stimulation layer (PSL) (depicted as a PSL 266 in FIG. 3) for calculating peak response maps from class activation maps. How the PRM generation MLA 260 calculates CAMs, and PRMs will be explained in more detail herein below.

As a non-limiting example, the classification network of the PRM generation MLA 260 may be implemented as one of: FCN8, PSPNeT, SegNet, and the like.

The region proposal MLA 270 is configured to: (i) receive an image; (ii) extract image features from the image; and (iii) generate a set of region proposals, such that pixels in a given region are similar and pixels in different regions are different, and that each region potentially includes an object.

The implementation of the region proposal MLA 270 is known in the art, and the region proposal MLA 270 is a pretrained MLA.

In one or more embodiments, regions may be generated and similarity of pixels or groups of pixels in a region may be evaluated based on brightness features, color features, texture features and the like. As a non-limiting example, the region proposal MLA 270 uses one or more of: histograms of oriented gradients (HOG), bag-of-words, scale invariant feature transform (SIFT) descriptors, and the like as features for determining regions and for segmentation thereof.

In one or more embodiments, each region proposal in the set of region proposals has or is associated with an objectness score, which is indicative of a confidence score that the region includes an object as determined by the region proposal MLA 270.

In the context of the present technology, the region proposal MLA 270 is used for generating region proposals, which are combined with the peak response maps output by the PRM generation MLA 260 for generating pseudo masks for image-level labelled images. The image-level labelled images with the pseudo masks are then used for training the instance segmentation MLA 280.

In one or more embodiments, the region proposal MLA 270 has access to another MLA such as a feature extraction MLA to generate the region proposals.

In one or more embodiments, the region proposal MLA 270 is implemented as a CNN. In one or more embodiments, the region proposal MLA 270 has an encoder decoder architecture.

As a non-limiting example, the region proposal MLA 270 may be implemented as: selective search, a region proposal network (RPN), DeepMask (arXiv: 1506.06204), Sharp-Mask (arXiv:1603.08695), MCG, COB, and MCT.

The instance segmentation MLA 280 is configured to: (i) receive an image; (ii) extract image features from the image; (iii) detect, based on the image features, a set of objects, each object having a respective object class; and (iv) generate, for each detected object, a respective predicted mask indicative of a boundary of the detected object in the image, i.e. the set of pixels belonging or delimiting the object having the respective object class in the image. The predicted mask encodes the object's spatial layout.

In the context of the present technology, the instance segmentation MLA 280 is trained to perform image segmentation based on inter alia pseudo masks of image-level labelled images generated by the trained PRM generation MLA 260.

In one or more embodiments, the instance segmentation MLA 280 is configured to generate high-level features and low-level features of the image. It is contemplated that the instance segmentation MLA 280 may perform object detection and mask generation concurrently.

It will be appreciated that the instance segmentation MLA 280 may include any MLA architecture that can be trained to perform instance segmentation on images.

In one or more embodiments, the instance segmentation MLA 280 comprises a region proposal network (RPN) and extracts features using regions of interest pooling (RoIPool) from each candidate box and performs classification and bounding-box regression, and outputs a binary mask for each region of interest (RoI). As a non-limiting example, the instance segmentation MLA 280 may be implemented as Mask R-CNN.

As another non-limiting example, in one or more embodiments where real-time instance segmentation is needed, the instance segmentation MLA 280 may be implemented as You Only Look At CoefficienTs (YOLACT) network (arXiv: 1904.02689). As yet another non-limiting example, in one or more embodiments where semantic segmentations is needed, the instance segmentation MLA 280 may be implemented as a DeepLab segmentation network.

As a non-limiting example the FCN may have a FCN8 architecture, a Deeplab architecture, a Tiramisu architecture, and a PSPnet architecture.

In one or more embodiments, the training server 220 may execute one or more of the set of MLAs 250. In one or more alternative embodiments, one or more the set of MLAs 250 may be executed by another server (not depicted), and the training server 220 may access the one or more of the set of MLAs 250 for training or for use by connecting to the server (not shown) via an API (not depicted), and specify parameters of the one or more of the set of MLAs 250, transmit data to and/or receive data from the one or more of the set of MLAs 250, without directly executing the one or more of the set of MLAs 250.

As a non-limiting example, one or more MLAs of the set of MLAs 250 may be hosted on a cloud service providing a machine learning API.

Database

A database 230 is communicatively coupled to the training server 220 via the communications network 240 but, in one or more alternative implementations, the database 230 may be communicatively coupled to the training server 220 without departing from the teachings of the present technology. Although the database 230 is illustrated schematically herein as a single entity, it will be appreciated that the database 230 may be configured in a distributed manner, for example, the database 230 may have different components, each component being configured for a particular kind of retrieval therefrom or storage therein.

The database 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on separate hardware, such as on the training server 220. The database 230 may receive data from the training server 220 for storage thereof and may provide stored data to the training server 220 for use thereof.

In one or more embodiments of the present technology, the database 230 is configured to: (i) store image-level labelled images, each image-level labelled image being associated with or having a label indicative of a presence of a given object having a respective object class; (ii) store class activation maps (CAMs) and peak response maps (PRMs) of the image-level labelled images generated by using the PRM generation MLA 260; (iii) store region proposals generated by the region proposal MLA 270; and (iv) store pseudo masks of the image-level labelled images.

Communication Network

In one or more embodiments of the present technology, the communications network 240 is the Internet. In one or more alternative non-limiting embodiments, the communication network 240 may be implemented as any suitable local area network (LAN), wide area network (WAN), a private communication network or the like. It will be appreciated that implementations for the communication network 240 are for illustration purposes only. How a communication link 245 (not separately numbered) between the training server 220, the database 230, and/or another electronic device (not shown) and the communications network 240 is implemented will depend inter alia on how each electronic device is implemented.

Peak Response Map (PRM) Generation Training Procedure

With reference to FIG. 3 there is shown a schematic diagram of a peak response map (PRM) generation training procedure 300 in accordance with one or more non-limiting embodiments of the present technology.

The PRM generation training procedure 300 is executed by the training server 220. It will be appreciated that PRM generation training procedure 300 may be executed by another electronic device comprising a processor. In one or other embodiments, the PRM generation training procedure 300 is executed in a distributed manner.

The purpose of the PRM generation training procedure 300 is to train the PRM generation MLA 260 to receive as an input an image, and to generate a peak response map (PRM) indicative of approximate locations of detected objects in the image, where each object has a respective object class.

The PRM generation training procedure 300 has access to the PRM generation MLA 260 for training thereof.

The PRM generation MLA 260 is configured to: (i) receive the set of image-level labelled images 310; (ii) extract, for an image-level labelled image 312, a set of image features; (iii) detect, based on the set of image features, a set of objects, each object having a respective object class; (iv) generate a class activation map (CAM) 322 for each respective object class in the set of objects; and (v) generate a peak response map (PRM) 332 using the CAM 322 for each object class of the set of objects.

It will be appreciated that the CAM may be generated during the detection of the set of objects in the image.

The PRM generation training procedure 300 receives the set of image-level labelled images 310, where a given labelled image 312 includes an image-level label 314 indicative of a presence of at least one object 316 having an object class 318 in the given labelled image 312.

In one or more embodiments, the set of image-level labelled images 310 is received from the database 230. In one or more alternative embodiments, the set of image-level labelled images 310 is received from another electronic device connected to the training server 220.

The given labelled image 312 is a digital image and has an image-level label 314 given as $=[y_1, y_2, \ldots, y_c]$, where $y_i=1$ or 0 indicates whether the given labelled image 312 has at least one object 316 of object class 318 $i$. In the non-limiting example shown in FIG. 3, the given labelled image 312 includes two cows, and the image-level label 314 may have one or more elements equal to 1, which corresponds to the object class "cow".

It will be appreciated that the number of classes in the given labelled image 312 is not limited, and the given labelled image 312 may have one or more objects, each object having a respective object class.

The PRM generation training procedure 300 trains the PRM generation MLA 260 on the set of image-level labelled images 310. The PRM generation MLA 260 is trained on the set of labelled images 310 using a classification loss function. It will be appreciated that during training, the set of image-level labelled images 310 is divided into a training set, a testing set, and a validation set.

The PRM generation MLA 260 includes a classification network. The classification network is CNN-based. As a non-limiting example, the classification network may be VGGNet or ResNet.

The PRM generation MLA 260 is a class activation map (CAM) based-classifier including a standard classification network 262 and a peak stimulation layer (PSL) 266.

The PRM generation MLA 260 extracts a set of image features from the given labelled image 312. The PRM generation MLA 260 detects, based on the set of image features, a set of objects. Each object of the set of objects is associated with an object class. It will be appreciated that different techniques may be used by the PRM generation MLA 260 to localize and classify objects in an image.

The PRM generation MLA 260 obtains a class activation map (CAM) 322 for each object class 318 in the given labelled image 312. The CAM 322 of the object class 318 is indicative of discriminative image regions 324 used by the PRM generation MLA 260 to identify the object 316 having the object class 318. In one or more embodiments, the CAM 322 may be obtained by performing global average pooling on the convolutional feature maps and by using the features for a fully-connected layer which produces a desired output, and by projecting back the weights of the output layer on the convolutional feature maps.

In other words, the CAM 322 specifies classification confidence for a given object class 318 at each image location in the given labelled image 312.

Local maximums or peaks 336 in the CAM 322 generally correspond to strong visual indicators inside a class instance. During training, the PRM generation MLA 260 is trained such that emergence of peaks in CAMs is stimulated, i.e. maximized. The PRM generation MLA 260 comprises a peak stimulation layer (PSL) 266 which stimulates peaks by computing their average loss with respect to a classification criterion, resulting in higher relative activation compared to the rest of the activations in class activation map. During inference, peaks are back-propagated to generate maps that highlight informative regions of each objects, which are referred to as peak response maps (PRMs). PRMs provide a fine-detailed separate representation for each instance in the image.

For an object class c, the peaks 336 in the PRM 332 are a set of locations $p^c=\{(i,j), (i,j), \ldots, (i,j)\}$ obtained from the CAM 322 $M^c$, representing local maximums within a window of size r.

The PSL 266 of the PRM generation MLA 260 identifies the peaks 336 in the class activation map (CAM) 322, takes their average as a confidence score for determining the approximate location of an object having the object class 318.

The PRM generation MLA 260 computes the classification loss 360 with respect to the confidence score, where the confidence is the average of the peaks in the CAM 322 for each class c.

To boost activation of the local maximas or peaks, the average activation $s^c$ is computed, which is expressed by equation (1):

$$S^c = \frac{1}{N^c}\sum_{k=1}^{N^c} M^c_{i_k, j_k}$$

Where $N^c$ is the number of peaks for class c, $i_k, j_k$ is a peak location, $M^c$ is the activation map corresponding to class c.

The PRM generation training procedure 300 trains the PRM generation MLA 260 until convergence. To train the classifier, the classification loss 360 is computed using the average activation of the local maximas of the CAM 322. The average activation is used for binary classification, i.e. the multi-label soft-margin loss.

The PRM generation MLA 260 obtains, using the CAM 322, a peak response map (PRM) 332 for each object class of a detected object in the image The PRM 332 comprises a set of peaks 334 representing local maximums in the CAM 322. The set of peaks 334 are indicative of potential object locations in the image. The set of peaks 334 in the PRM 332 are segmentation seeds that indicative of salient parts of the objects in the given image-level labelled image 312.

After the PRM generation training procedure 300, the PRM generation MLA 260 can be used for performing object detection and generate PRMs for unseen images, i.e. images the PRM generation MLA 260 has not been trained on.

Pseudo Mask Generation Procedure

Figure 4:
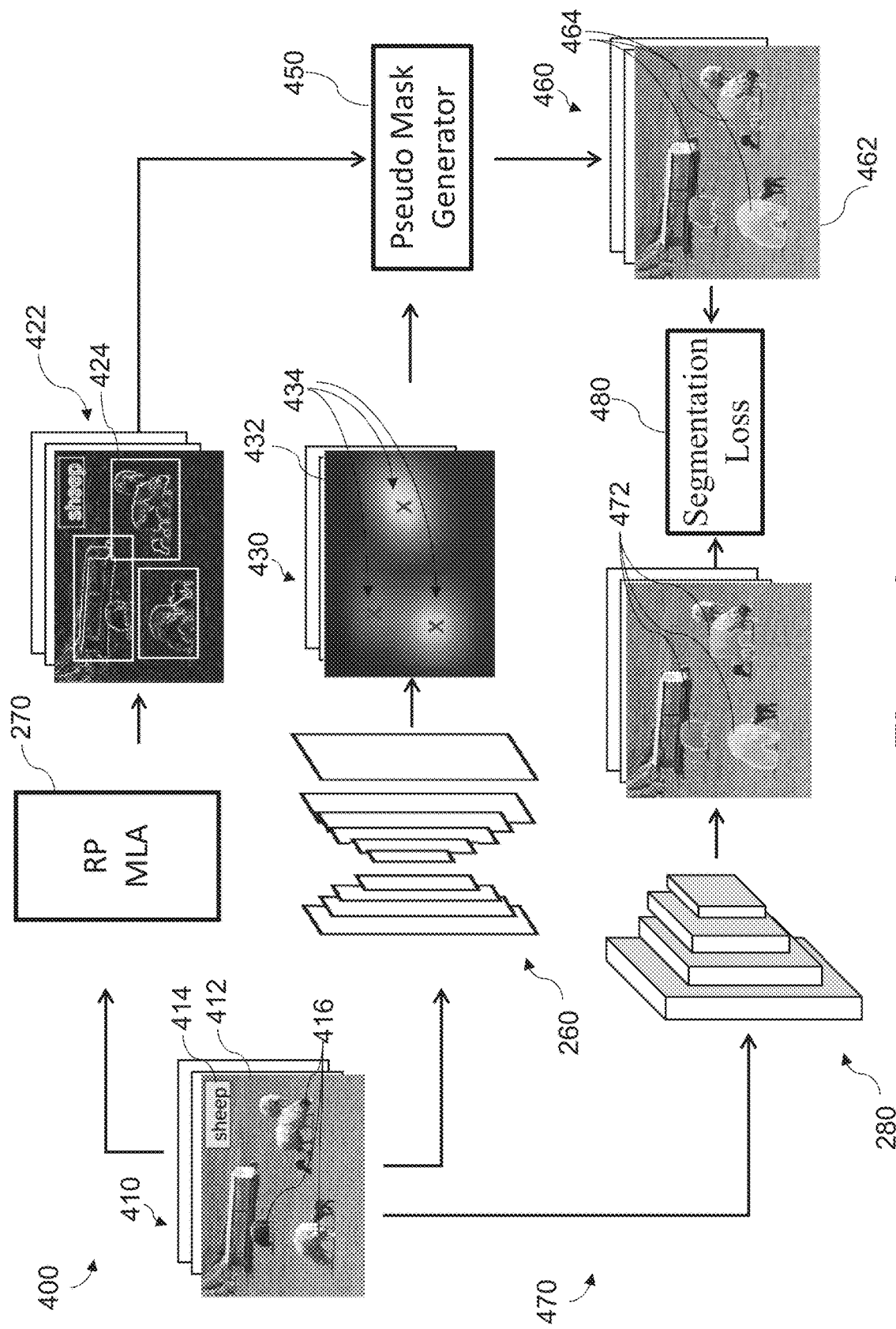
FIG. 4 depicts a schematic diagram of a pseudo mask generation procedure and an instance segmentation machine learning algorithm (MLA) training procedure in accordance with one or more non-limiting embodiments of the present technology.

With reference to FIG. 4, there is depicted a pseudo mask generation procedure 400 and an instance segmentation training procedure 470 in accordance with one or more non-limiting embodiments of the present technology.

The pseudo mask generation procedure 400 is configured to: (i) access the PRM generation MLA 260 and the region proposal MLA 270; (ii) receive a set of images 410, each image 412 having an image-level label of a given object class 414 of at least one object 416 present in the image 412; (iii) generate, using the PRM generation MLA 260, a PRM 432 of the given object class 414 in the image 410; (iv) obtain, for the image 412, using the region proposal MLA 270, a set of region proposals 422; and (v) generate, for the image 412, based on the PRM 432 and the set of region proposals 422, a pseudo mask 464, the respective pseudo mask 464 including a set of pixels potentially representing the at least one object 416 having the respective object class 416 in the image 412.

The pseudo mask generation procedure 400 is executed for each image in the set of images 410.

In one or more embodiments, the pseudo mask generation procedure 400 is executed during the instance segmentation training procedure 470.

To generate pseudo masks, the pseudo mask generation procedure 400 accesses the trained PRM generation MLA 260 and the trained region proposal MLA 270.

The PRM generation MLA 260 detects at least one object having a respective object class 414 in the image 412 based on image features thereof, and generates a PRM 432 for the respective object class 414. In one or more embodiments, the PRM generation MLA 260 detects the object based on the image-level label, i.e. respective object class 414 of the image 412. In one or more alternative embodiments, the set of images 410 do not have image-level labels and the PRM generation MLA 260 detects the at least one object 416 having the respective object class 414.

In one or more embodiments, to generate the PRM 432, the "PRM generation MLA 260 generates a CAM of the image 410, and determines a set of peaks from the CAM to obtain the PRM 432.

The region proposal MLA 270 receives the image 412 and generates a set of region proposals 422. The set of region proposals 422 includes regions in the image 412 that potentially include objects.

The pseudo mask generator 450 receives the set of regions proposals 422 generated by the region proposal MLA 270. In one or more embodiments, each region proposal in the set of region proposals 422 is associated with an objectness score which is confidence measure for the region proposal including an object.

The pseudo mask generator 450 generates a pseudo mask 464 based on the set of region proposals 422 intersecting the set of peaks 434 in the PRM 432.

In one or more embodiments, the pseudo mask generator 450 replaces peaks 434 in the PRM 432 with a region proposal 424 from the set of region proposals 422 based on the respective objectness score.

The pseudo mask generator 450 adopts a de-noising strategy where it selects a region proposal 424 randomly based on its respective objectness score: proposals 424 with higher objectness are more likely to be selected for replacing a peak 434 in the PRM 432.

To obtain the respective pseudo mask 464 for an object located at (i,j), pseudo mask generator 450 generates a set of n proposals having masks that intersect with (i,j), namely, $\{(T_1, b_1), (T_2, b_2), \ldots, (T_n, b_n)\}$ with mask $T_k$ and objectness score $b_k$.

The probability of selecting a proposal mask $T_k$ is expressed by equation (2):

$$P(T_k) = \frac{b_k}{\sum_{j=1}^{n} b_j} \quad (2)$$

Where $b_k$ is the objectness score and n is a number of proposals.

It will be appreciated that the region proposals 424, despite having different objectness scores, have common pixels that correspond to the salient parts of the located objects. The pseudo mask generator 450 repeats the random proposal selection process at each training iteration.

While region proposal are not originally associated with a class label, the pseudo mask generator 450 obtains the object class label information from the PRM generation MLA 260 and assigns it to the corresponding proposals, i.e. the respective pseudo mask 464.

It will be appreciated that the respective pseudo mask 464 includes a set of pixels potentially representing the at least one object 416 having the respective object class 416 in the image 412. Thus, the respective pseudo mask 464 includes at least a portion of pixels belonging to the at least one object 416 having the respective object class 416. As a non-limiting example, the respective pseudo mask 464 may be a matrix having values of 1 for pixels belonging to the at least one object 416 having the respective object class 416 and 0 for pixels not belonging to the at least one object 416.

The pseudo mask generation procedure 400 obtains a pseudo mask labelled image 462, which is the image 412 labelled with the pseudo mask 464.

The pseudo mask generation procedure 400 is repeated for the set of images 410 to generate a set of pseudo mask labelled images 460. Each pseudo mask labelled image includes an object which has an object class, and a pseudo mask.

The pseudo mask generation procedure 400 stores the set of pseudo mask labelled images 460.

The set of pseudo mask labelled images 460 is used for training the instance segmentation MLA 280 during the instance segmentation training procedure 470.

Instance Segmentation Training Procedure

The instance segmentation training procedure 470 is configured to: (i) access the instance segmentation MLA 280; (ii) receive a set of pseudo mask labelled images 460; and (iii) train the instance segmentation MLA 280 based on the set of pseudo mask labelled images 460 for performing instance segmentation, i.e. predicting segmentation masks for the set of pseudo mask labelled images 460.

The instance segmentation training procedure 470 is executed by the training server 220.

The instance segmentation training procedure 470 receives the set of pseudo mask labelled images 460, where each pseudo mask labelled image 462 includes: the respective object 416 having the respective object class 414, and a pseudo mask 464 including a set of pixels potentially representing the at least one object 416 having the respective object class 416. The respective pseudo mask 464 is used as target for the instance segmentation MLA 280.

In one or more embodiments, the set of pseudo mask labelled images 460 is received from the database 230. In one or more alternative embodiments, the set of pseudo mask labelled images 460 is received from another electronic device (not shown) connected to the training server 220.

The instance segmentation training procedure 470 trains the instance segmentation MLA 280 to detect objects and to perform segmentation using the set of pseudo mask labelled images 460.

In one or more embodiments, the instance segmentation MLA 280 is trained to output, for the pseudo mask labelled image 462: a detected object 416 with a respective object class 414, a bounding box indicative of an approximate location and size of the detected object 416, and a predicted segmentation mask 472 indicative of a set of pixels belonging to the at least one object 416 having the respective object class 416.

In one or more embodiments, for an image I, with target pseudo masks T, the instance segmentation MLA 280 with parameters θ is trained by optimizing an objective function 480 expressed by equation (3):

$$\mathcal{L}_{task}(f_s, X_s, Y_s) = \mathcal{L}_{cls} + \mathcal{L}_{box} + \mathcal{L}_{mask} \quad (3)$$

Where $\mathcal{L}_{cls}$ is a classification loss, $\mathcal{L}_{box}$ is a localization loss, and $\mathcal{L}_{mask}$ is the segmentation loss.

In one or more embodiments, the segmentation loss $\mathcal{L}_{mask}$ is an average binary cross-entropy loss.

In one or more embodiments, the instance segmentation training procedure 470 is expressed using pseudocode 1:

Pseudocode 1
Train a CAM-based classifier C until convergence
while iter<max_iter do Randomly sample a training image I;
Generate a set of proposals P for I;
Use PSL on C to obtain the set of peaks L for I;
Initialize an empty list of Targets;
for $(i_k, j_k) \in L$ do
   Select a proposal $(G_b, b_k)$ randomly using equation
     (1) it has to intersect with $(i_k, j_k)$
   Add $G_k$ to list T
end
Compute $\mathcal{L}(I, T, \Theta)$ as in equation (3)
Update the weights for 0 using back-propagation;
end while At test time, the trained instance segmentation MLA 280 is used to predict the object masks for an unseen image. It will be appreciated that the instance segmentation MLA 280 predicts object masks without using the PRM generation MLA 260 or generating peak response maps and pseudo masks, which are only used for training the instance segmentation MLA 280.

As a non-limiting example, ResNet-50 trained on the ImageNet dataset may be used as the backbone for the PRM generation MLA 260, and the instance segmentation MLA 280 may be implemented as Mask R-CNN equipped with a feature pyramid network that extracts features at different resolutions. The pretrained weights and the parameters are finetuned on the PASCAL VOC 202 training set.

As a non-limiting example, the input images for the instance segmentation MLA 280 implemented as Mask R-CNN have been scaled such that the short axis has a minimum of 800 px and the long axis a maximum of 1333 px. During training, the training server 220 may include a single NVIDIA® Titan X® GPU, with the batch size set as 1 and using the SGD optimizer with a learning rate of 0.00125 for 50K iterations.

Instance Segmentation Refinement Procedure

Figure 5:
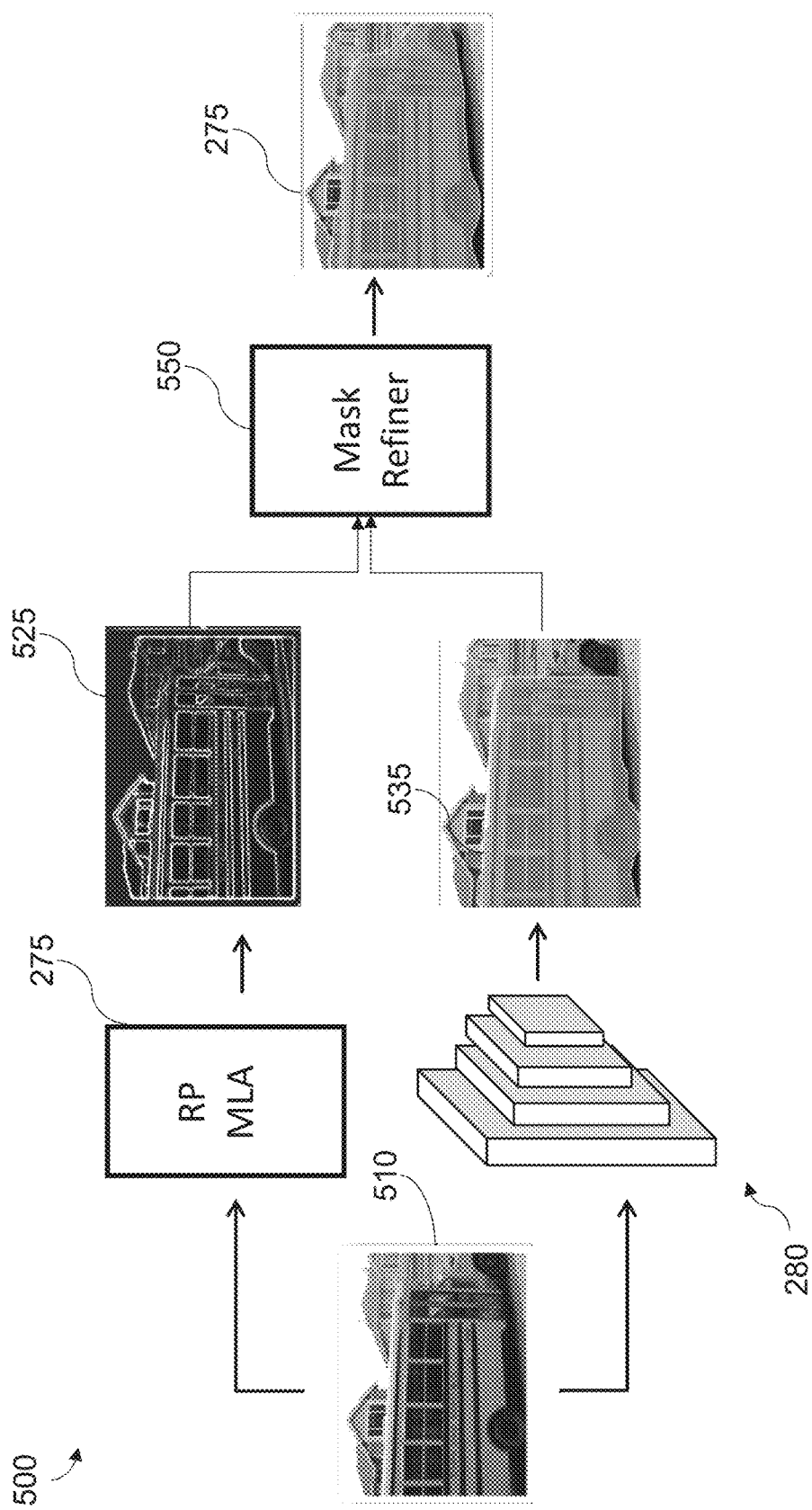
FIG. 5 depicts an instance segmentation refinement procedure in accordance with one or more non-limiting embodiments of the present technology.

With reference to FIG. 5, there is depicted a schematic diagram of an instance segmentation refinement procedure 500 in accordance with one or more non-limiting embodiments of the present technology.

The instance segmentation refinement procedure 500 is executed by the training server 220 and may be used to refine or enrich the masks predicted by the instance segmentation MLA 280 to obtain a more accurate delimitation thereof.

In one or more embodiments, to refine a predicted mask 535 generated by the instance segmentation MLA 280, the region proposal MLA 270 is used.

The region proposal MLA 270 generates a set of region proposals 525 for a given image 510 for which the predicted mask 535 was generated by the instance segmentation MLA 280.

The mask refiner 550 receives the set of regions proposals 525 and the predicted mask 535. The mask refiner 550 compares the set of region proposals 525 and the predicted mask 535 and determines a similarity score therebetween. In one or more embodiments, the similarity score is a Jaccard similarity coefficient.

The mask refiner 550 replaces at least a portion of the predicted mask 535 with the region proposals 525 of highest Jaccard similarity to obtain a refined predicted mask 545. In one or more embodiments, the mask refiner 550 replaces the region proposals 525 having a similarity score above a threshold score.

Figure 6:
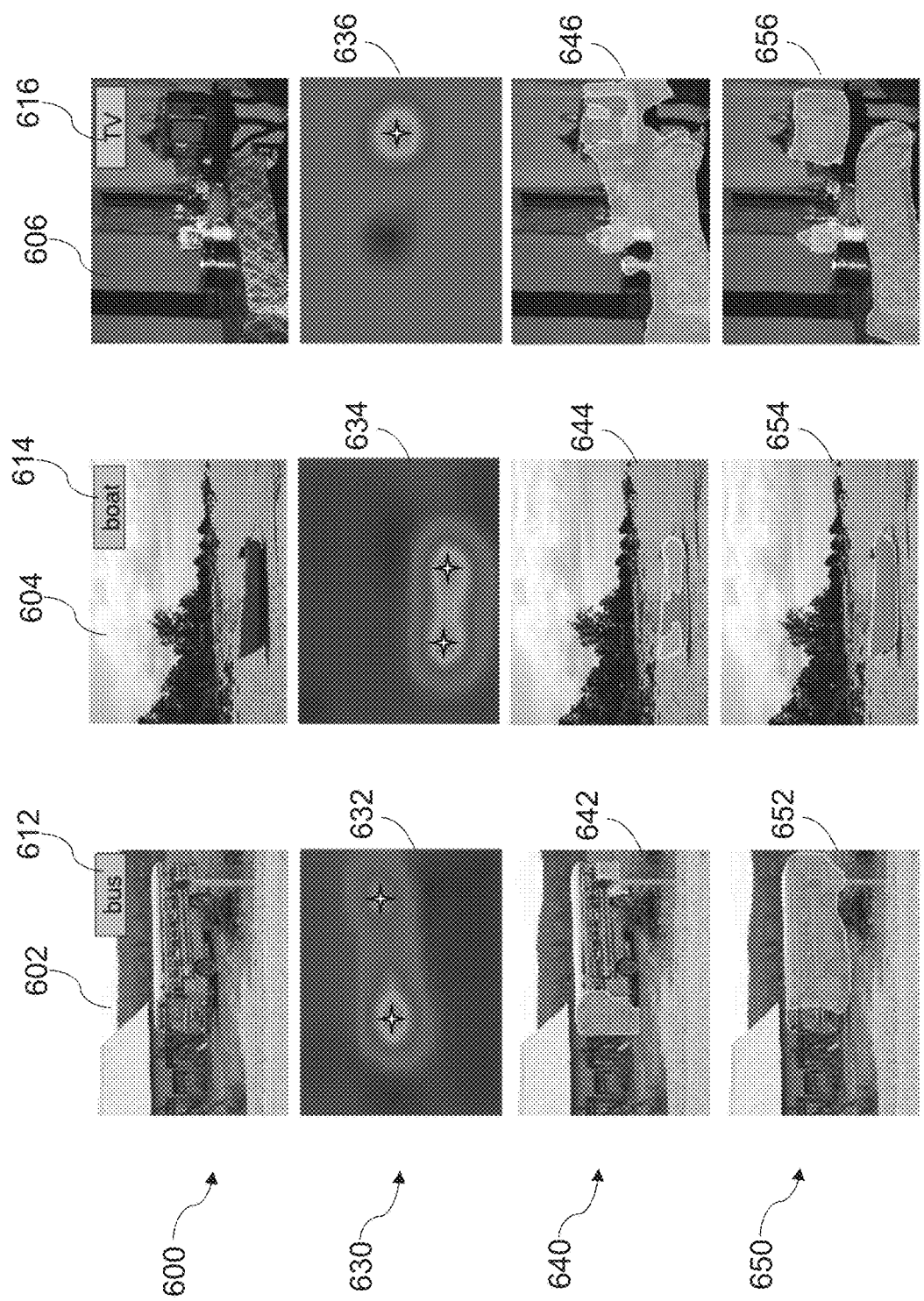
FIG. 6 depicts non-limiting examples of training images, PRMs, pseudo masks and instance segmentation in accordance with one or more non-limiting embodiments of the present technology.

Non-limiting examples of a set of training images 600 with respective peak response maps 630, respective pseudo masks 640 and respective predicted masks 650 are depicted with reference to FIG. 6 in accordance with one or more non-limiting embodiments of the present technology.

The set of training images 600 includes a first image 602 which depicts a bus in front of a house and has a "bus" image-level label, a second image 604 which depicts a boat in front of water and trees and is labelled with a "boat" image-level label, and a third image 606 which depicts a table with dishes beside a television and is labelled with a "TV" image-level label.

The PRM generation MLA 260 generates a first PRM 632 for the first image 602, a second PRM 634 for the second image 604 and a third PRM 636 for the third image 606, which are indicative of approximate locations of each of the respective objects in the respective images 602, 604, 606.

The region proposal MLA 270 receives the set of training images 600 and generates a respective set of region proposals for each of the first image 602, the second image 604 and the third image 606 (not shown).

The pseudo mask generator 450 receives each of the first PRM 632, the second PRM 634 and the third PRM 636 from the PRM generation MLA 260 with the respective set of regions proposals (not shown) from the region proposal MLA 270 and generates a first pseudo mask 642 for the first image 602, a second pseudo mask 644 for the second image 604 and a third pseudo mask 646 for the third image 606.

The instance segmentation training procedure 470 trains the instance segmentation MLA 280 on the first image 602 labelled with the first pseudo mask 642, the second image 604 labelled with the second pseudo mask 644, and the third image 606 labelled with the third pseudo mask 646.

The instance segmentation MLA 280 outputs a first predicted mask 652 for the first image 602, a second predicted mask 654 for the second image 604, and a third predicted mask 656 for the third image 606.

Figure 7:
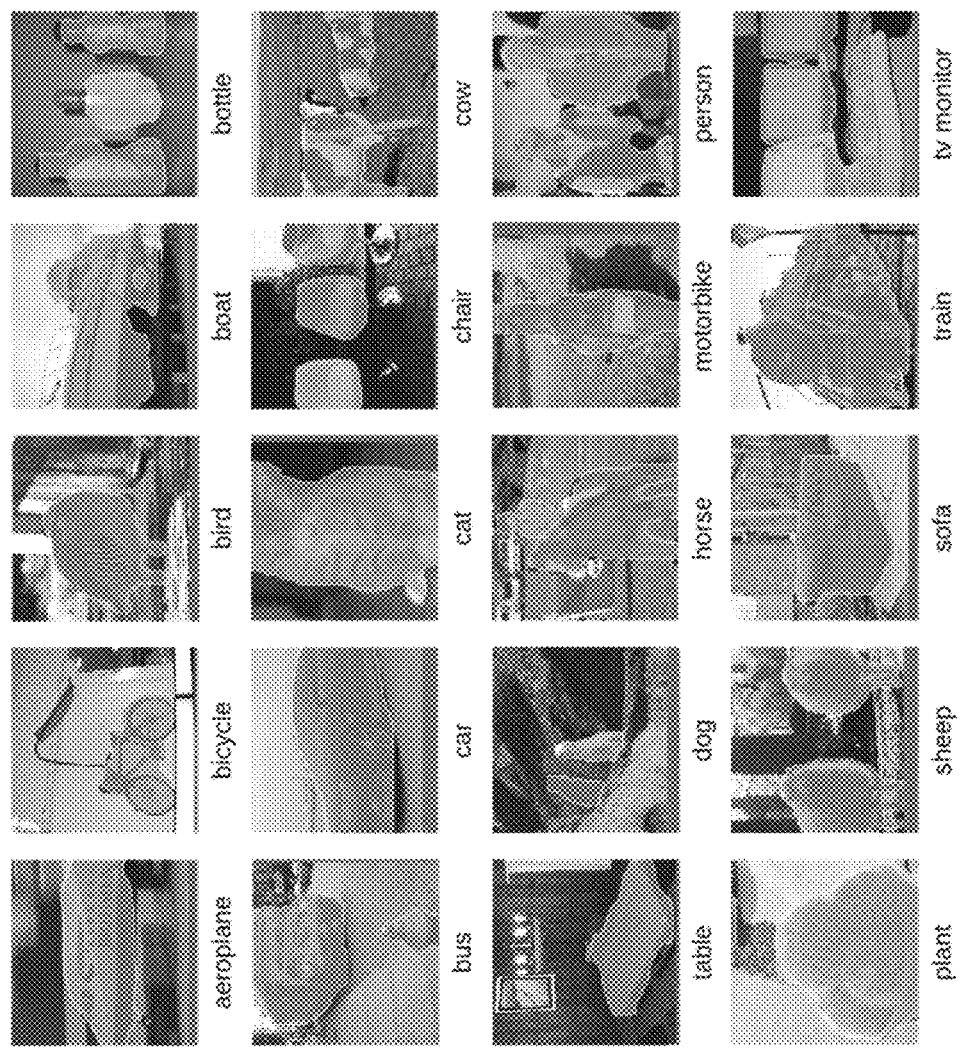
FIG. 7 depicts non-limiting examples of qualitative results of segmented images obtained from the PASCAL VOC 202 dataset in accordance with one or more non-limiting embodiments of the present technology.

FIG. 7 shows non-limiting examples of qualitative results of segmented images 700 obtained from the PASCAL VOC 202 dataset in accordance with one or more non-limiting embodiments of the present technology.

The segmented images 700 have been generated by the instance segmentation MLA 280 implemented as Mask R-CNN on the PASCAL VOC 2012 validation set.

Method Description

Figure 8:
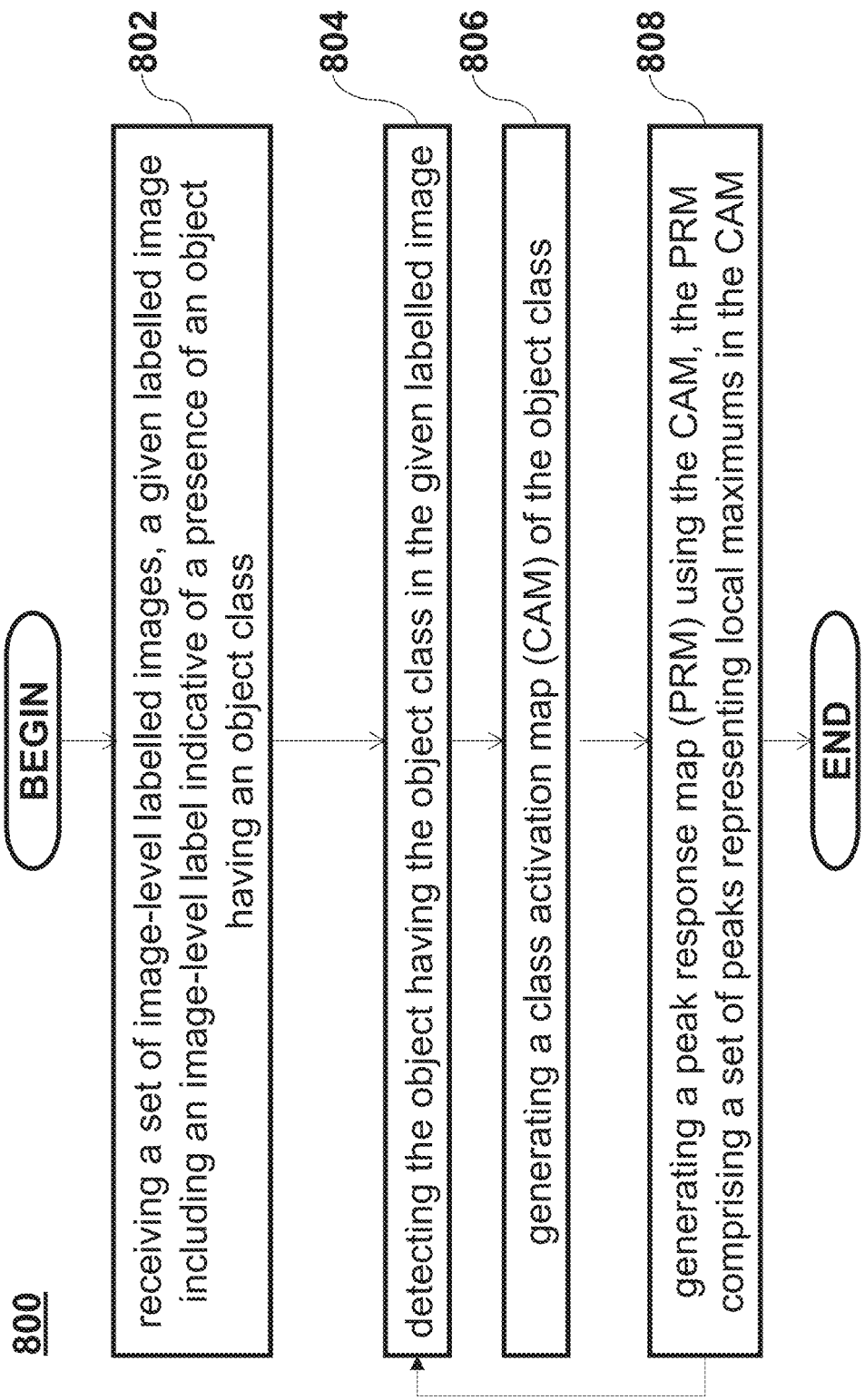
FIG. 8 depicts a flow chart of a method of training the PRM MLA in accordance with one or more non-limiting embodiments of the present technology.

FIG. 8 depicts a flowchart of a method 800 of training the peak response map (PRM) generation MLA 260, the method 800 being executed in accordance with one or more non-limiting embodiments of the present technology.

The training server 220 comprises a processor 110 and a non-transitory computer readable storage medium such as the solid-state drive 120 and/or the random-access memory 130 storing computer-readable instructions. The processor 110, upon executing the computer-readable instructions, is configured to execute the method 800.

The training server 220 has access to the set of MLAs 250 including the image feature extraction MLA 255, the PRM generation MLA 260, the region proposal MLA 270, and the instance segmentation MLA 280.

The method 800 starts at processing step 802.

According to processing step 802, the training server 220 receives a set of image-level labelled images 310, where a given labelled image 312 includes an image-level label 314 indicative of a presence of an object having an object class 318 in the given labelled image 312. The training server 220 provides the set of image-level labelled images 310 to the PRM generation MLA 260 for training thereof.

According to processing step 804, during the training, the PRM generation MLA 260 detects the object having the object class 318 in the given labelled image 312. In one or more embodiments, the PRM generation MLA 260 extracts a set of image features, and detects, based on the image features, the object having the object class 318.

According to processing step 806, during training, the training server 220 generates a class activation map (CAM) 322 of the object class 318 in the given labelled image 312. The CAM 322 of the object class 318 is indicative of the discriminative image regions used by the PRM generation MLA 260 to identify the object class 318. The CAM 322 specifies a classification confidence for a given object class 318 at each image location in the given labelled image 312.

According to processing step 808, during training, the training server 220 generates a peak response map (PRM) 332 using the CAM 322. The set of peaks 334 in the PRM 332 represent local maximums in the CAM 322. The set of peaks 334 are indicative of potential object locations in the image.

The training server 220 executes processing steps 804 to 808 for each image-level labelled image in the set of image-level labelled images 310 until convergence of the PRM generation MLA 260. To train the classifier, the classification loss 360 is computed using the average activation of the local maximas of the CAM 322. The average activation is used for binary classification, i.e. the multi-label soft-margin loss.

Figure 9:
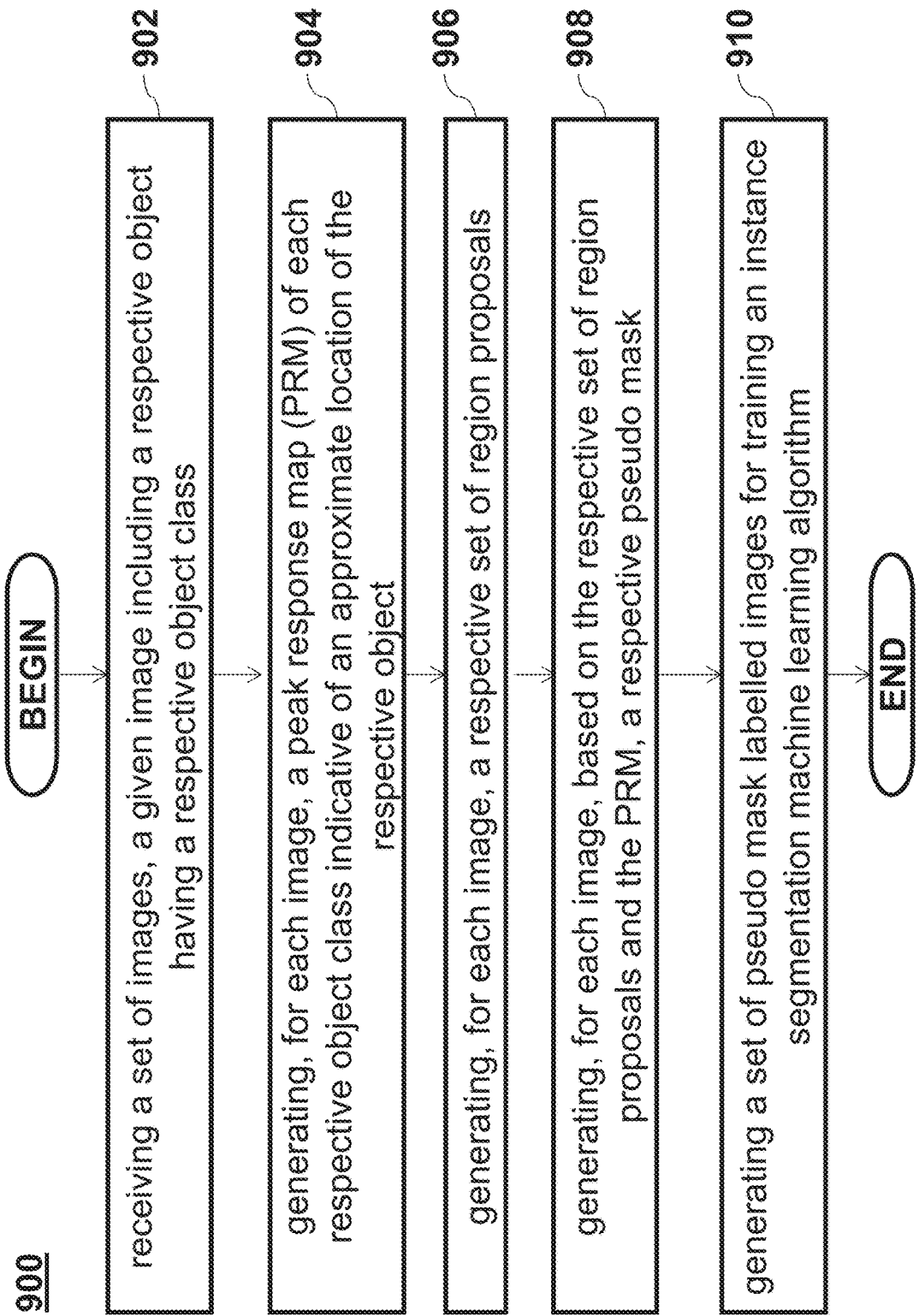
FIG. 9 depicts a flow chart of a method of generating a set of pseudo mask labelled images in accordance with one or more non-limiting embodiments of the present technology.

FIG. 9 depicts a flowchart of a method 900 of generating training images for the instance segmentation MLA 280 in the form of a set of pseudo mask labelled images 460, the method 900 being executed in accordance with one or more non-limiting embodiments of the present technology.

The method 900 may be executed after the method 800.

The training server 220 comprises a processor 110 and a non-transitory computer readable storage medium such as the solid-state drive 120 and/or the random-access memory 130 storing computer-readable instructions. The processor 110, upon executing the computer-readable instructions, is configured to execute the method 900.

The training server 220 has access to the set of MLAs 250 including the PRM generation MLA 260, the region proposal MLA 270, and the instance segmentation MLA 280.

According to processing step 902, the training server 220 receives the set of images 410, where a given image 412 includes an image-level label indicative of a presence of a respective object 416 having a respective object class 414 in the given image 412. In one or more embodiments, the training server 220 receives the set of images 410 from the database 230.

According to processing step 904, the training server 220 generates, for each image 412, a PRM 432 of each respective object class 414 using the PRM generation MLA 260. The PRM 432 is indicative of an approximate location of the respective object 416 in the given image 412. In one or more embodiments, to generate the PRM 432, the PRM generation MLA 260 generates, for each image 412 of the set of images 410, a CAM and determines a set of peaks from the CAM to obtain the PRM 432.

In one or more alternative embodiments, the set of images 410 may not have image-level labels, and then PRM generation MLA 260 detects the respective object 416 having the respective object class 414 in each given image 412 before generating the CAM and the PRM 432.

According to processing step 906, the training server 220 generates a respective set of region proposals 424 for each image 410 in the set of images 410 using the region proposal MLA 270. In one or more embodiments, each region proposal in the respective set of region proposals 424 includes a respective objectness score representative of a confidence score of the region proposal including an object.

In one or more embodiments, processing steps 904 may be executed in parallel. In one or more other embodiments, processing step 906 may be executed before processing step 904.

According to processing step 908, the training server 220 generates a respective pseudo mask 464 based on the respective set of regions proposals 424 and the respective PRM 432 for each image 410 in the set of images 410. The respective pseudo mask 464 includes a respective set of pixels potentially representing the at least one respective object 416 having the respective object class 414 in the image 412.

In one or more embodiments, to generate the respective pseudo mask 464, the training server 220 selects one or more region proposals from the set of region proposals 424 which intersect with peaks in the PRM 432.

In one or more embodiments, to generate the respective pseudo mask 464, the training server 220 adopts a de-noising strategy where it selects a region proposal 424 randomly based on its objectness score: proposals 424 with higher objectness are more likely to be selected for replacing a peak 434 in the PRM 432. To obtain the respective pseudo mask 464 for an object located at (i,j), the training server 220 generates a set of n proposals having masks that intersect with (i,j).

At processing step 910, the training server 220 generates a set of pseudo mask labelled images 460, where each pseudo mask labelled image includes at least one respective object 416 which has an object class 414 and the respective pseudo mask 464, which may be provided for training the instance segmentation MLA 280, where each training image includes as a label the respective pseudo mask 464 of the respective object 416 having the respective object class 414.

The method 900 ends.

Figure 10:
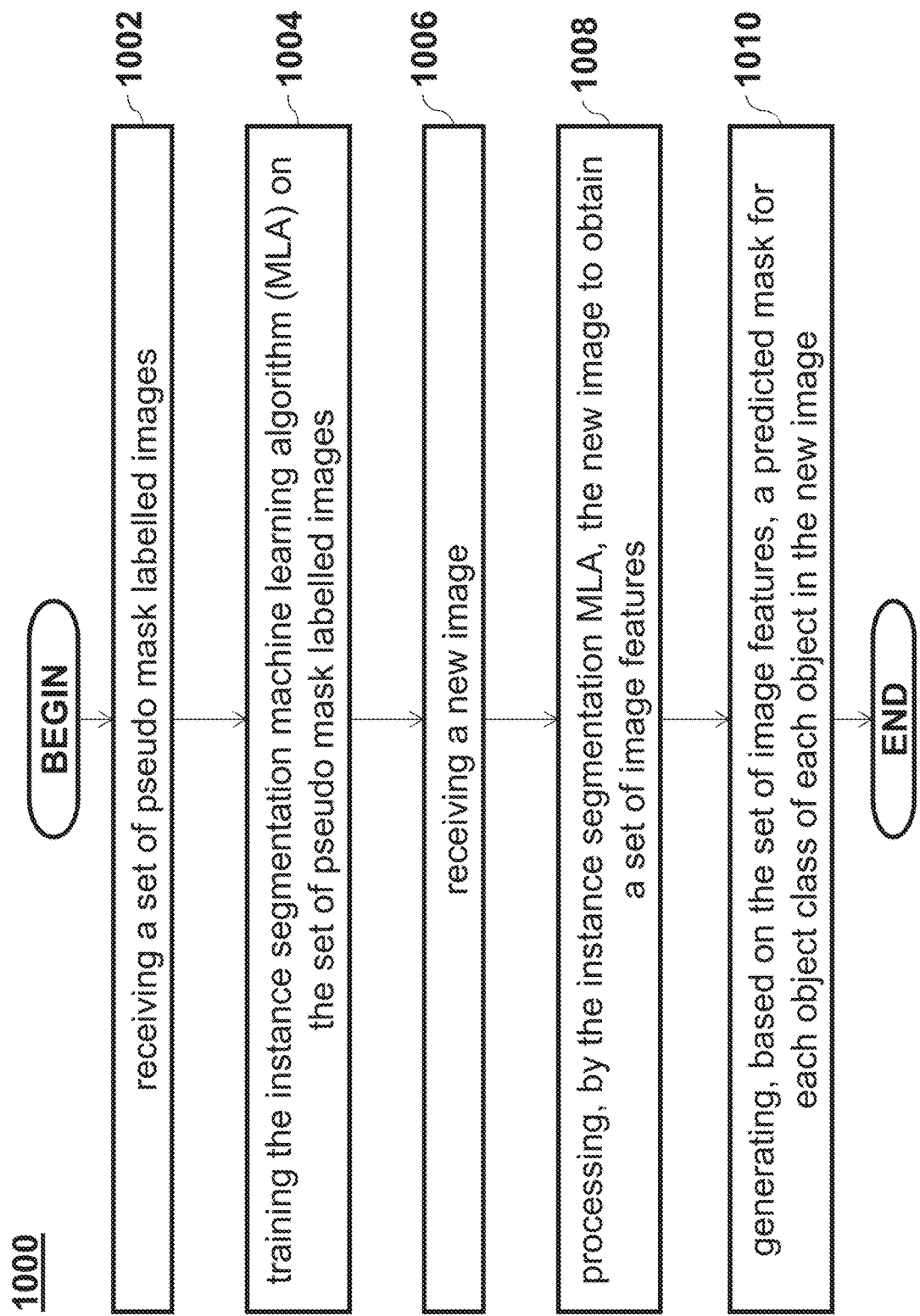
FIG. 10 depicts a flow chart of a method of training the instance segmentation MLA in accordance with one or more non-limiting embodiments of the present technology.

FIG. 10 depicts a flowchart of a method 1000 of training the instance segmentation MLA 280, the method 1000 being executed in accordance with one or more non-limiting embodiments of the present technology.

The training server 220 comprises a processor 110 and a non-transitory computer readable storage medium such as the solid-state drive 120 and/or the random-access memory 130 storing computer-readable instructions. The processor 110, upon executing the computer-readable instructions, is configured to execute the method 1000.

The training server 220 has access to the set of MLAs 250 including the PRM generation MLA 260, the region proposal MLA 270, and the instance segmentation MLA 280.

The method 1000 is executed after the method 900.

The method 1000 begins at processing step 1002.

According to processing step 1002, the training server 220 receives the set of pseudo mask labelled images 460, where each pseudo mask labelled image 462 includes: an the respective object 416 having the respective object class 414, and a pseudo mask 464 including a set of pixels potentially representing the at least one object 416 having the respective object class 416. The respective pseudo mask 464 is used as target for the instance segmentation MLA 280.

According to step 1004, the training server 220 trains the instance segmentation MLA 280 on the set of pseudo mask labelled images 460 to predict a mask of an object having an object class in an unseen image, i.e. an image the instance segmentation MLA 280 has not been trained on. The instance segmentation MLA 280 uses the respective pseudo mask 464 as a target. In one or more embodiments, the training server 220 trains the instance segmentation MLA 280 to optimize an objective function including: a classification loss, a localization loss and a segmentation loss.

In one or more embodiments, the instance segmentation MLA 280 is implemented as Mask R-CNN.

According to processing step 1006, the training server 220 receives a new image, i.e. an unseen image the instance segmentation MLA 280 has not been trained on and not included in the set of pseudo mask labelled images 410.

It will be appreciated that processing step 1006 may be executed at any time after training the instance segmentation MLA 280 on the set of pseudo mask labelled images 460.

According to processing step 1008, the instance segmentation MLA 280 processes the unseen image to extract image features therefrom.

According to processing step 1010, the instance segmentation MLA 280 generates, based on the image features, a predicted mask for each object class of each object in the new image, where each predicted mask is indicative of a set of pixels belonging to the at least one object having the respective object class. The instance segmentation MLA 280 performs object detection and instance segmentation.

In other words, the instance segmentation MLA 280 classifies each pixel in the new image as belonging to a detected object or not to form the predicted mask of the respective object class.

In one or more embodiments, the instance segmentation MLA 280 accesses the region proposal MLA 270 to refine the predicted mask by generating region proposals and by combining region proposals with the predicted mask to a obtain a refined predicted mask.

The method 1000 ends.

It will be appreciated that one or more embodiments of the present technology aim to expand a range of technical solutions for addressing a particular technical problem, namely improving performance of machine learning models for performing instance segmentation by generating instance segmentation training data from image-level training data, which enables saving computational resources and time.

It will be appreciated that not all technical effects mentioned herein need to be enjoyed in each and every embodiment of the present technology. For example, one or more embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

The invention claimed is:

1. A method for generating a set of training images for an instance segmentation machine learning algorithm (MLA), the method being executed by a processor, the processor having access to:

a classification MLA having been trained to detect objects in an image and generate a class activation map (CAM) indicative of discriminative regions used for detecting the objects, a region proposal MLA having been trained to generate region proposals from an image, the method comprising:

receiving a set of image-level labelled images, each image-level labelled image comprising an object class label indicative of a presence of a respective object having a respective object class in the image;

detecting, using the classification MLA, in each image-level labelled image, the respective object having the respective object class;

determining, using the classification MLA, for each image-level labelled image of the set of image-level labelled images, a respective CAM indicative of discriminative regions used by the classification MLA to detect the respective object class;

generating, using the region proposal MLA, for each image-level labelled image of the set of image-level labelled images, a respective set of region proposals, each region proposal comprising a respective potential object;

generating, for each image-level labelled image of the set of image-level labelled images, based on the respective CAM and the respective set of region proposals, a respective pseudo mask of the respective object indicative of pixels in the image-level labelled image corresponding to the respective object class; and generating a set of training images to be provided for training an instance segmentation MLA, each training image comprising:

a respective object class of the respective object, and the respective pseudo mask of the respective object having the respective object class.

2. The method of claim 1, further comprising:

training the instance segmentation MLA on the set of training images by using the respective pseudo mask as a target for generating a predicted mask for an object class of an object in a new image.

3. The method of claim 1, wherein the method further comprises, prior to the generating the pseudo mask for each image-level labelled image:

generating, by the classification MLA, a respective peak response map (PRM) for each respective CAM by determining a respective set of peaks indicative of local maximas in the respective CAM; and wherein the generating the pseudo mask is further based on the respective PRM.

4. The method of claim 3, wherein the respective set of peaks are indicative of approximate locations of objects having the respective object class.

5. The method of claim 4, wherein the generating the respective pseudo mask for the respective object class comprises:

selecting at least one region proposal of the set of region proposals intersecting with a peak of the respective set of peaks in the PRM to obtain the respective pseudo mask.

6. The method of claim 5, wherein each region proposal of the respective set of region proposals is associated with a respective objectness score indicative of a probability of the region proposal comprising a respective object; and wherein the selecting the at least one region proposal is based on the respective objectness score.

7. The method of claim 3, wherein the classification MLA comprises a convolutional neural network, a fully connected layer (FCL), and a peak stimulation layer.

8. The method of claim 1, wherein the instance segmentation MLA comprises a convolutional neural network.

9. A method for training an instance segmentation machine learning algorithm (MLA), the method being executed by a processor, the processor having access to:
a classification MLA having been trained to detect objects in an image and generate a class activation map (CAM) indicative of discriminative regions used for detecting the objects,
a region proposal MLA having been trained to generate region proposals from an image, and
the instance segmentation MLA,
the method comprising:
receiving a set of image-level labelled images, each image-level labelled image comprising a respective object class label indicative of a presence of a respective object having a respective object class in the image;
detecting, using the classification MLA, in each image-level labelled image, the respective object having the respective object class, the detecting comprising generating a respective CAM indicative of discriminative regions used by the classification MLA to detect the respective object class;
generating, using the region proposal MLA, for each image-level labelled image of the set of image-level labelled images, a respective set of region proposals, each region proposal comprising a respective potential object;
generating, for each image-level labelled image of the set of image-level labelled images, based on the respective CAM and the respective set of region proposals, a respective pseudo mask of the respective object indicative of pixels in the image-level labelled image corresponding to the respective object class; and
training an instance segmentation MLA on the set of image-level labelled images and the respective pseudo masks by using the respective pseudo mask having the respective object class label as a target.

10. The method of claim 9, wherein
the detecting further comprises:
generating, by the classification MLA, a respective peak response map (PRM) for each respective CAM by determining a respective set of peaks indicative of local maximas in the respective CAM; and wherein
the generating the pseudo mask is further based on the respective PRM.

11. The method of claim 10, further comprising:
receiving a new image, the new image not being included in the set of image-level labelled images;
generating, by the instance segmentation MLA, a set of image features; and
detecting, by the instance segmentation MLA, based on the set of image features, an object, the object having an object class, the detecting comprising classifying a set of pixels in the image as belonging to the object class of the object to obtain a predicted mask of the object.

12. The method of claim 11, further comprising:
generating, using the region proposal MLA, a set of region proposals for the new image; and
generating, based on the set of region proposals and the predicted mask of the object, a refined predicted mask.

13. A system for generating a set of training images for training an instance segmentation machine learning algorithm (MLA), the system comprising a processor, the processor having access to:
a classification MLA having been trained to detect objects in an image and generate a class activation map (CAM) indicative of discriminative regions used for detecting the objects,
a region proposal MLA having been trained to generate region proposals from an image,
the processor being operatively connected to a non-transitory storage medium comprising instructions;
the processor, upon executing the instructions, being configured for:
receiving a set of image-level labelled images, each image-level labelled image comprising an object class label indicative of a presence of a respective object having a respective object class in the image;
detecting, using the classification MLA, in each image-level labelled image, the respective object having the respective object class;
determining, using the classification MLA, for each image-level labelled image of the set of image-level labelled images, a respective CAM indicative of discriminative regions used by the classification MLA to detect the respective object class;
generating, using the region proposal MLA, for each image-level labelled image of the set of image-level labelled images, a respective set of region proposals, each region proposal comprising a respective potential object;
generating, for each image-level labelled image of the set of image-level labelled images, based on the respective CAM and the respective set of region proposals, a respective pseudo mask of the respective object indicative of pixels in the image-level labelled image corresponding to the respective object class; and
generating a set of training images to be provided for training an instance segmentation MLA, each training image comprising:
a respective object class of the respective object, and
the respective pseudo mask of the respective object having the respective object class.

14. The system of claim 13, wherein the processor is further configured for:
training the instance segmentation MLA on the set of training images by using the respective pseudo mask as a target for generating a predicted mask for an object class of an object in a new image.

15. The system of claim 13, wherein
the processor is further configured for, prior to the generating the pseudo mask for each image-level labelled image:
generating, by the classification MLA, a respective peak response map (PRM) for each respective CAM by determining a respective set of peaks indicative of local maximas in the respective CAM; and wherein
the generating the pseudo mask is further based on the respective PRM.

16. The system of claim 15, wherein the respective set of peaks are indicative of approximate locations of objects having the respective object class.

17. The system of claim 16, wherein the generating the respective pseudo mask for the respective object class comprises:
selecting at least one region proposal of the set of region proposals intersecting with a peak of the respective set of peaks in the PRM to obtain the respective pseudo mask.

18. The system of claim 17, wherein
each region proposal of the respective set of region proposals is associated with a respective objectness score indicative of a probability of the region proposal comprising a respective object; and wherein
the selecting the at least one region proposal is based on the respective objectness score.

19. The system of claim 15, wherein the classification MLA comprises a convolutional neural network, a fully connected layer (FCL), and a peak stimulation layer.

20. The system of claim 15, wherein the instance segmentation MLA comprises a convolutional neural network.

* * * * *